A. R. REYNOLDS.
Decarbonizing Malleable Cast Iron, &c.
No. 210,964. Patented Dec. 17, 1878.
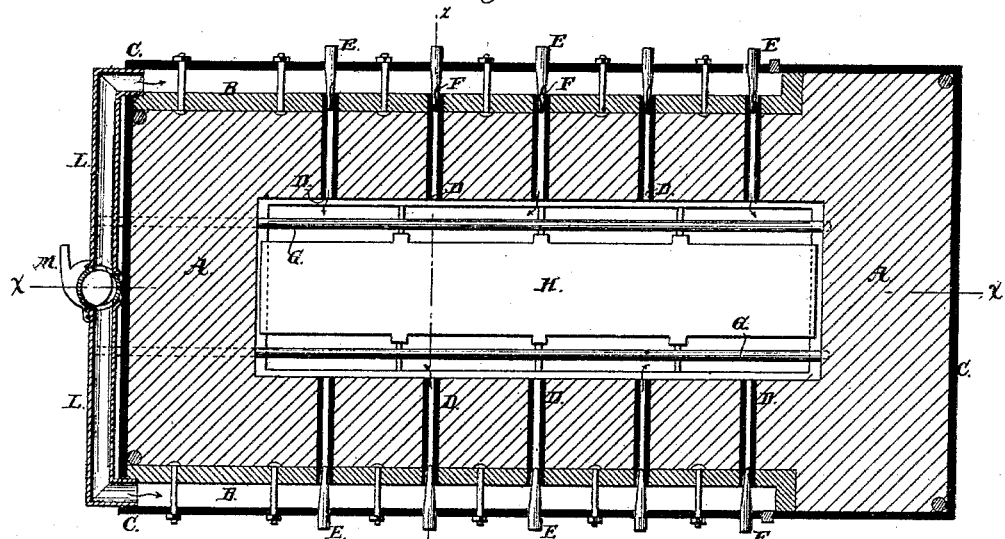
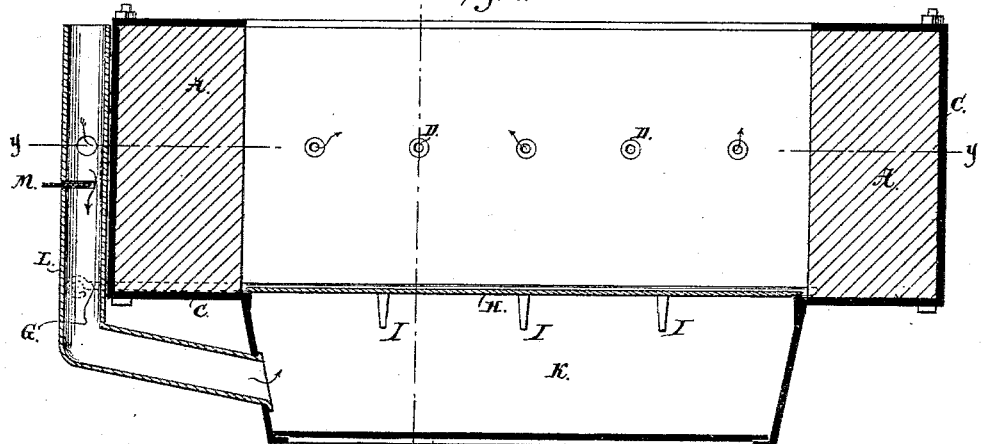
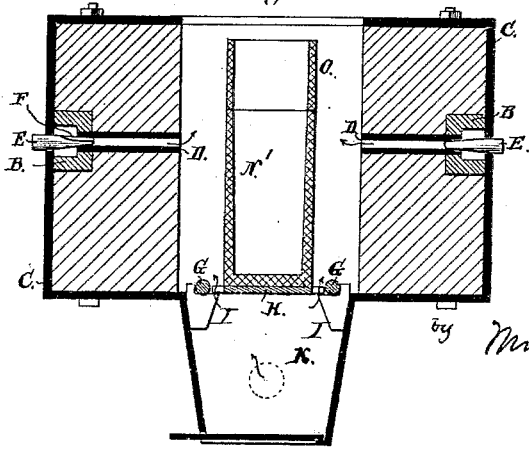
Attest.
Geo. H. Graham
Alex Scott
Inventor;
Asa R. Reynolds,
by Munson & Philipp
Attorneys.

2 Sheets—Sheet 2.

A. R. REYNOLDS.
Decarbonizing Malleable Cast Iron, &c.

No. 210,964.  Patented Dec. 17, 1878.

Attest,
Geo. H. Graham
Alex. Scott

Inventor;
Asa R. Reynolds.
by Munson & Philipp
Attorneys.

UNITED STATES PATENT OFFICE.

ASA R. REYNOLDS, OF NEW YORK, N. Y.

IMPROVEMENT IN DECARBONIZING MALLEABLE CAST-IRON, &c.

Specification forming part of Letters Patent No. 210,964, dated December 17, 1878; application filed August 16, 1878.

*To all whom it may concern:*

Be it known that I, ASA R. REYNOLDS, of the city, county, and State of New York, have invented certain new and useful improvements in the art of decarburizing or rendering malleable cast-iron and carburizing or case-hardening wrought-iron; and I do hereby declare the following to be a full, clear, and exact description of the same, reference being had to the accompanying drawings, forming a part of this specification, in which—

Figure 4:
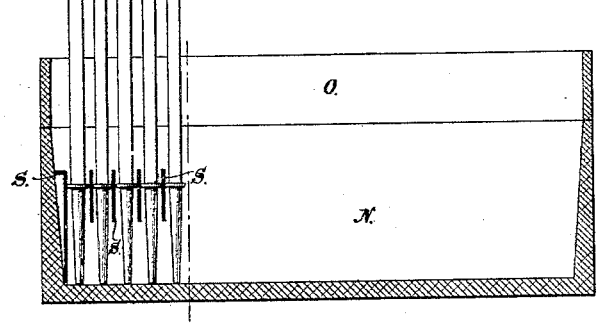
Figures 5, 7:
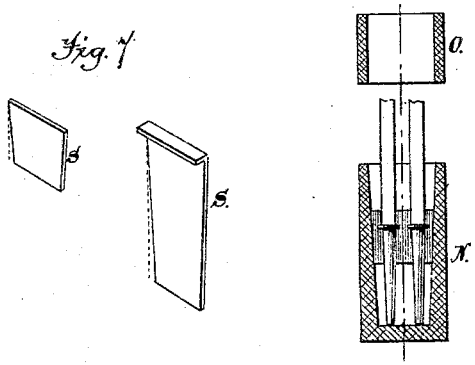
Figure 6:
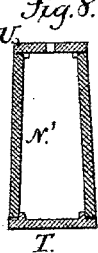
Figure 8:
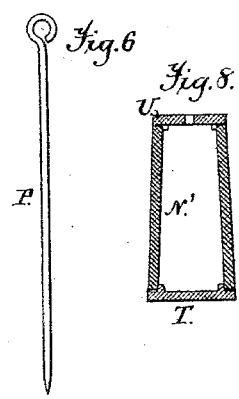

Figure 1 is a horizontal section of a furnace used by me, taken on the line $y\ y$ of Fig. 2. Fig. 2 is a vertical longitudinal section of said furnace, taken on the line $x\ x$ of Fig. 1. Fig. 3 is a vertical transverse section of the same, taken on the line $z\ z$, Figs. 1 and 2. Fig. 4 is a vertical longitudinal section of a pot and its shield containing carriage-axles to be carburized or case-hardened, said axles having dividing-plates between them. Fig. 5 is a vertical transverse section of said pot and its shield. Fig. 6 is a view of a trial-rod. Fig. 7 is a view of dividing-plates for the carburizing-pot; and Fig. 8 is a vertical section of a pot with false top and bottom, used for decarburizing.

Heretofore in decarburizing or rendering malleable articles of cast-iron, and in carburizing or case-hardening articles of wrought-iron, the pots in which such articles were placed for these purposes had to be subjected to heat a great length of time, varying, for decarburizing, from six to eleven days, and for carburizing, also a long period of time. This was owing to the fact that if great heat were applied by using blasts of air in the furnaces in common use, to shorten the time required for decarburizing or carburizing, the pots containing the articles of cast or wrought iron would be rapidly destroyed, and could not be heated equably throughout, and the walls of the furnace would also be destroyed.

The principal object of my invention is to cheapen the expense and shorten very materially the time now required to decarburize or render malleable articles of cast-iron and to carburize or case-harden articles of wrought-iron; and it consists, first, in a furnace for decarburizing articles of cast-iron and carburizing articles of wrought-iron, and for other purposes, of the combination of elevated wind-chambers with a lower wind-chamber, the upper wind-chamber being provided with tuyeres that conduct the blasts of air at the proper point of elevation and the proper angle to produce a heat at or near the top of the pots or crucibles placed with their contents in the interior of the furnace equal, or nearly equal, to the heat produced at the bottom of said pots or crucibles when the air from said lower wind-chamber is used, as will be described; second, in wind-gages inserted in the elevated wind-chambers to control the blasts of air passing through the tuyeres, to bring the top of the pots or crucibles with their contents to a heat equal, or nearly equal, to the heat at the bottom of said pots or crucibles, as will be described.

In the drawings, A is the body of the furnace, having on two sides cast-iron elevated wind-chambers B to receive and distribute blasts of air. Covering these chambers B and the exterior of the body A is a casing of metal, C. Leading from the elevated wind-chambers B are tuyeres D, arranged at such angle and elevation with relation to the top of the pots which rest within the furnace as to produce a heat at or near the top of the pots or crucibles equal, or nearly equal, to that produced at their bottom.

E are wind-gages, inserted through the wind-chambers B from the outside of the casing C and entering the tuyeres D. These wind-gages are conical where they enter the tuyeres D, and as they are moved toward or from said tuyeres D open or close the same, and thus control the blast. Each of these wind-gages is provided at its conical end with a small groove, F, which, when the gages are moved in to close the tuyeres, admits a small quantity of air to preserve the tuyeres.

At the bottom of the furnace are grate-bars G, which are capable of being drawn out when desired for cleaning the furnace. There is also at the bottom of the furnace a metal plate, H, resting upon metal brackets I connected to the casing C, which brackets also support the grate-bars G. This metal plate is shorter and narrower than the interior of the furnace, to allow for expansion when heated.

At the bottom of the furnace is a wind-chamber, K, connected by pipes L with the chambers B, a valve or damper, M, being provided to control the blast to said chambers.

N is a pot for receiving the articles to be decarburized, and N' a pot to receive the articles to be carburized, and the materials used for these purposes. These pots or crucibles, as well as the brick or slabs composing the inner walls of the furnace, are made from the materials from which the fire-brick is made, or equivalents of the same, such as any artificial preparation of sand, clay, or other materials capable of being used in place of fire-brick that will absorb carbon, and properly baked. To increase the durability of these pots or crucibles and the inner walls of the furnace, and render them almost indestructible by heat, I impregnate them with carbon. In practice, I have done this by filling each pot or crucible resting on the metal plate H in the furnace with animal or wood charcoal or any other carbonaceous substance, placing some on their outside, and also placing some of such substance upon the inner walls of the furnace. A fire being then made in the latter both the pots and the inner walls of the furnace are brought to intense heat, about a bright cherry-red heat, some four or five hours, and then the residuum of the carbonaceous material is removed.

It has been found in practice that after the use of the pots a rough coating of slag or vitrified matter has formed on the outside of them. This matter may be removed in any desirable way, and the slight abrasion the pots receive by removing it may be remedied by putting a thin coating of the composition from which they are made on such abrasion.

The pots or crucibles may be of any shape desirable, and any convenient number of them may be employed in each furnace.

For decarburizing it is desirable that the pots should be wider at the bottom than at the top to allow the material used for decarburizing, and articles of cast-iron, to settle without breaking said pots, a false bottom, T, of the same material as the pots are composed of, being employed to enable their contents to be readily removed, and a lid, U, as shown in Fig. 8, the lid having one or more holes for the insertion of the trial-rod, to be described hereinafter.

Both the false bottom T and lid U are impregnated with carbon in the same manner as the pots.

In use this pot is placed upon the plate H within the furnace, like the carburizing-pot, as shown in Fig. 3.

O is a shield made of the same composition as the pot N, and impregnated with carbon in the same manner as said pot, which is placed on top of said pot in use to prevent the loss of carbon, as will be more fully explained hereinafter.

P is a trial-rod of wrought-iron, preferably a quarter of an inch in diameter, which can be inserted into the pots, and removed from the same and inspected to arrive accurately at their heat and that of their contents at all points in the interior of said pots.

S are dividing-plates, used when carriage-axles or similar articles are to be carburized, inserted between them to keep them in their proper position when packing them in the pot N with carbonaceous material, and which are removed therefrom after packing to leave room for the expansion of the articles to be carburized.

I will first describe my improvements as used for decarburizing articles of cast-iron.

The articles are properly packed in the pot N', made of the composition and impregnated with carbon, as above described, and resting upon its false bottom T, said articles being surrounded with powdered iron-stone, or some of the metallic oxides, or iron scales, or smithy-slack, or powdered red hematite of iron, or any other absorbent of carbon. It is then resting on its false bottom T and covered with its lid U, placed on the metal plate H in the interior of the furnace, and then surrounded on its sides and covered with fuel, (preferably coke,) sufficient light fuel being placed upon the grate-bars G to start the fire. The blast is then turned on, which, entering from the chamber K, between the grate-bars G and plate H, and through the tuyeres D, heats the pot and its contents to about the same temperature at its bottom and top.

The pot and its contents are brought to about a cherry-red heat for about one hour, at which point the decarburizing material, such as smithy-slack, becomes cemented together. It is then brought to a white heat, at which it is kept for about three hours, when the furnace is allowed to cool, the grate-bars G are drawn out, the pot and its contents removed, and the articles of cast-iron properly malleableized taken therefrom.

The heats are determined by the insertion into the pot, through the hole or holes in its lid, withdrawal from, and inspection of, the trial-rod P.

Articles of cast-iron decarburized or rendered malleable, as above described, can be practically carburized or case-hardened, if desired.

I shall now describe my improvements as used for carburizing.

The articles of wrought-iron are placed in the pot N with charcoal, or broken bones, or particles of horn or rawhide, or tanned leather, or other carbonaceous material not packed tight.

The pot resting upon the metal plate H, as shown in Fig. 3, is surrounded on its sides and ends with fuel, (preferably anthracite coal or coke,) sufficient light fuel being placed upon the grate-bars to start the fire. The blast is then turned on, as before described for decarburizing articles of cast-iron, and the pot and its contents are brought to about a low red heat, at which point the articles commence to absorb carbon, which heat is maintained for a length of time sufficient to give the proper depth of conversion.

For small carriage-axles this heat should be continued about one hour and a quarter; for large axles for carriages, about one hour and a half; for car-axles, about four hours, and about the same length of time for the wearing parts of locomotives. The length of time depends upon the size of the articles to be carburized and the depth of conversion desired. The heat is also determined by the introduction into the pot, withdrawal therefrom, and inspection of, the trial-rod P.

When the pot and its contents have been subjected to heat the proper length of time the articles are removed from the pot (which latter may remain in the furnace) and plunged into water to harden them.

The residuum of the carbonaceous material is removed after the pots have cooled, when they are ready for a repetition of the process.

For carburizing carriage-axles and other such articles, I find it desirable to separate them by means of dividing-plates while packing them in the pot, then removing said plates to allow room for expansion of the metal. I also employ the shield O, before described, when carburizing carriage-axles and other similar articles that do not need to be case-hardened throughout their entire extent. This shield is placed on the top of the pot, as shown in Fig. 4 of the drawings, and is filled to its top with the same material used in the pot for carburizing. By means of this shield the heat at the top of the pot is checked at the line of demarkation between the pot and it, as most of the shield is above the fire in the furnace. It protects the beds of carriage-axles and parts of other articles not desired to be carburized or case-hardened from scaling, and its contained carbonaceous material not being brought to a red heat, there is no loss of carbon contained in the shield.

In using crucibles made from the materials and impregnated with carbon, as before described, for melting or treating metals, they are placed with their contents within the furnace, resting upon fire-brick or tile, which in turn rests upon the metal plate, and subjected to heat the same as the pots, the degree of heat and length of time to which they are subjected depending, however, upon the metals being treated or melted which they contain, such as brass, cast-iron, steel, &c. After they have been used in treating or melting metals and metal articles, and while they are still hot at or about a bright cherry-red heat, I again fill them with carbonaceous material, by which they are again impregnated with carbon from the inside, then let them cool, and then remove the residuum of the carbonaceous material. When they are to be again used to treat or melt metals and metal articles, and while the metal is in them and they are in the furnace, some of the said carbonaceous material is placed about the outside of the same with the fuel, by which they are again impregnated with carbon from the outside, when they are brought to about a bright cherry-red heat. The crucibles are preferably treated in this manner after every heat, their life being thus renewed and they rendered almost indestructible by heat.

Each time the pots made from the materials and impregnated with carbon for decarburizing articles of cast-iron, and carburizing articles of wrought-iron, are used they are again impregnated from the inside by the carbon from the articles of cast-iron in decarburizing articles of cast-iron, or by the carbon from the carbonaceous material used in carburizing articles of wrought-iron, and from the outside by placing some carbonaceous material about their outside with the fuel, the life of the pots being thus renewed every time a charge is treated in them, and are thus rendered almost indestructible by heat.

Each time the furnace is used its walls are also reimpregnated with carbon by placing carbonaceous material in contact therewith or in the fuel for heating them, their life thus being renewed each time the furnace is used, and they thus being rendered almost indestructible by heat.

I do not herein claim, broadly, the treating of pots, crucibles, or walls of furnaces by impregnating them, made from the materials described, with carbon, as that forms the subject-matter of a separate application for a patent made by me.

What I do claim as new, and desire to secure by Letters Patent, is—

1. In a furnace for decarburizing articles of cast-iron and carburizing articles of wrought-iron, and for other purposes, the combination of elevated wind-chambers with a lower wind-chamber, the upper wind-chamber being provided with tuyeres that conduct the blasts of air at the proper point of elevation and the proper angle to produce a heat at or near the top of the pots or crucibles placed with their contents in the interior of the furnace equal or nearly equal to the heat produced at or near the bottom of said pots or crucibles when the air from said lower wind-chamber is used, substantially as described.

2. The combination of wind-gages E, each provided with a small groove, combined with the upper wind-chambers and with the tuyeres to control the blasts of air passing through the latter, to bring the top of the pots or crucibles, with their contents, to a heat equal or nearly equal to the heat at or near the bottom of said pots or crucibles, substantially as described.

In testimony whereof I have signed my name to this specification in the presence of two subscribing witnesses.

ASA R. REYNOLDS.

Witnesses:
M. B. PHILIPP,
GEO. H. GRAHAM.